(12) United States Patent
Choi et al.

(10) Patent No.: US 12,450,877 B2
(45) Date of Patent: Oct. 21, 2025

(54) ELECTRONIC DEVICE ASSIGNING RECOGNITION MODEL TO COMPUTING UNIT AND OPERATING METHOD THEREOF

(71) Applicant: Samsung Electronics Co., Ltd., Suwon-si (KR)

(72) Inventors: Hyunsoo Choi, Suwon-si (KR); Inhak Na, Suwon-si (KR); Jaewook Shin, Suwon-si (KR); Myungjin Eom, Suwon-si (KR); Aeran Lim, Suwon-si (KR); Junho Rim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 389 days.

(21) Appl. No.: 17/991,293

(22) Filed: Nov. 21, 2022

(65) Prior Publication Data

US 2023/0091104 A1   Mar. 23, 2023

Related U.S. Application Data

(63) Continuation of application No. PCT/KR2021/006792, filed on Jun. 1, 2021.

(30) Foreign Application Priority Data

Jun. 15, 2020  (KR) .................. 10-2020-0072604

(51) Int. Cl.
  *G06V 10/77*  (2022.01)
  *G06V 10/26*  (2022.01)
  *G06V 10/70*  (2022.01)

(52) U.S. Cl.
  CPC .......... *G06V 10/7715* (2022.01); *G06V 10/26* (2022.01); *G06V 10/87* (2022.01)

(58) Field of Classification Search
  None
  See application file for complete search history.

(56) References Cited

U.S. PATENT DOCUMENTS 9,607,355 B2 *  3/2017  Zou .................. G06F 9/522
10,176,550 B1   1/2019  Baggerman
(Continued)

FOREIGN PATENT DOCUMENTS

KR  10-2018-0025754 A  3/2018
KR  10-2018-0080098 A  7/2018
(Continued)

OTHER PUBLICATIONS

International Search Report dated Sep. 3, 2021, issued in International Patent Application No. PCT/KR2021/006792.

*Primary Examiner* — Tahmina N Ansari
(74) *Attorney, Agent, or Firm* — Jefferson IP Law, LLP

(57) ABSTRACT

An electronic device recognizing an object is provided. The electronic device includes a plurality of computing units, a memory, and a processor configured to control at least one of the plurality of computing units such that object information about objects obtained by recognizing the objects existing in a space by using a first recognition model, divide the space into a plurality of subset spaces, based on the object information, determine at least one recognition model, based on characteristic information of each of the subset spaces, assign the determined recognition model to one computing unit, based on characteristic information of each of a plurality of computing units and characteristic information of the determined recognition model, and control the plurality of computing units to perform object recognition by using the determined recognition model and the one computing unit in each of the subset spaces.

15 Claims, 13 Drawing Sheets

(56) References Cited

U.S. PATENT DOCUMENTS

| | | | |
|---|---|---|---|
| 10,970,605 B2 | 4/2021 | Kang et al. | |
| 11,458,623 B2 | 10/2022 | Maeng et al. | |
| 2014/0193074 A1* | 7/2014 | Huang | G06V 10/50 |
| | | | 382/180 |
| 2016/0321776 A1* | 11/2016 | Zou | G06F 9/522 |
| 2018/0039835 A1* | 2/2018 | Rajkumar | G06F 18/2431 |
| 2018/0353042 A1 | 12/2018 | Gil et al. | |
| 2019/0251654 A1 | 8/2019 | Gao et al. | |
| 2020/0012288 A1 | 1/2020 | Kim | |
| 2020/0042796 A1 | 2/2020 | Kim et al. | |
| 2021/0174151 A1* | 6/2021 | Paula | H04W 12/122 |
| 2021/0251450 A1 | 8/2021 | Xue et al. | |
| 2021/0370511 A1 | 12/2021 | Hong | |
| 2021/0401250 A1 | 12/2021 | Lee et al. | |
| 2022/0004805 A1* | 1/2022 | Choi | G06F 18/2431 |

FOREIGN PATENT DOCUMENTS

| | | |
|---|---|---|
| KR | 10-2018-0081546 A | 7/2018 |
| KR | 10-2018-0134230 A | 12/2018 |
| KR | 10-2019-0094133 A | 8/2019 |
| KR | 10-2019-0098108 A | 8/2019 |
| KR | 10-2020-0036677 A | 4/2020 |
| KR | 10-2020-0055239 A | 5/2020 |
| KR | 10-2020-0066130 A | 6/2020 |
| KR | 10-2129258 B1 | 7/2020 |
| KR | 10-2302198 B1 | 9/2021 |
| KR | 10-2022-0004453 A | 1/2022 |

* cited by examiner

ELECTRONIC DEVICE ASSIGNING RECOGNITION MODEL TO COMPUTING UNIT AND OPERATING METHOD THEREOF

CROSS-REFERENCE TO RELATED APPLICATION(S)

This application is a continuation application, claiming priority under § 365(c), of an International application No. PCT/KR2021/006792, filed on Jun. 1, 2021, which is based on and claims the benefit of a Korean patent application number 10-2020-0072604, filed on Jun. 15, 2020, in the Korean Intellectual Property Office, the disclosure of which is incorporated by reference herein in its entirety.

BACKGROUND

1. Field

The disclosure relates to an electronic device and an operating method thereof. More particularly, the disclosure relates to an electronic device performing an object recognition by using a plurality of computing units and an operating method thereof.

2. Description of Related Art

Artificial intelligence (AI) system is a computer system that implements human-level intelligence. Unlike existing Rule-based smart systems, AI is a system in which machines learn, judge and derive a desired result or perform a desired action. As the AI systems are used, the AI systems are increasingly recognizing and improving their understanding of a user's preferences, and thus, existing rule-based smart systems have been gradually replaced with deep-learning-based AI systems.

AI technology consists of machine learning (deep learning) and element technologies that utilize machine learning. Machine learning is an algorithm technology that classifies/learns the characteristics of input data by itself, and by utilizing machine learning algorithms such as deep learning, consists of technical fields such as linguistic understanding, visual understanding, reasoning/prediction, knowledge representation, and motion control.

Element technologies for implementing AI technology may include at least one from linguistic understanding technology that recognizes human language/characters, reasoning/prediction technology for logically inferring and predicting by determining information, knowledge representation technology that processes human experience information as knowledge data, and motion control technology that controls movements of a robot.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device including a plurality of computing units and an operating method thereof, wherein the electronic device may effectively use the plurality of computing units by using a computing unit corresponding to a characteristic of each space.

Additional aspects will be set forth in part in the description which follows and, in part, will be apparent from the description, or may be learned by practice of the presented embodiments.

In accordance with an aspect of the disclosure, an electronic device is provided. The electronic device includes a plurality of computing units, a memory storing a plurality of recognition models and one or more instructions, and a processor configured to execute the one or more instructions stored in the memory, wherein the processor is configured to control at least one of the plurality of computing units such that object information about one or more objects are obtained by recognizing the one or more objects existing in a certain space by using a first recognition model from among the plurality of recognition models, divide the space into a plurality of subset spaces, based on the object information, determine at least one recognition model to be used in each of the subset spaces, from among the plurality of recognition models, based on characteristic information of each of the subset spaces, assign the determined recognition model to one of the plurality of computing units, based on characteristic information of each of the plurality of computing units and characteristic information of the determined recognition model, and control the plurality of computing units to perform object recognition by using the determined recognition model and the computing unit to which the determined recognition model is assigned, in each of the subset spaces.

The electronic device further includes a sensing unit configured to obtain spatial structure information of the space by scanning the space, wherein the processor is configured to generate a space map, based on the spatial structure information, and divide the space into the plurality of subset spaces, based on the space map and the object information.

The processor may be configured to determine whether a scanning of the space is necessary, based on whether a structure of the space has been changed, and control the sensing unit to scan the space, when the scanning of the space is necessary.

Classes recognizable by the first recognition model may be higher classes than classes that are recognizable by the recognition model determined with respect to each of the subset spaces.

Kinds of objects that are recognizable by the recognition model determined with respect to each of the subset spaces may be less than kinds of objects that are recognizable by the first recognition model.

The characteristic information of the plurality of computing units includes operation speed, and the characteristic information of the recognition model includes at least one of a number of classes that are recognizable, an operation amount, and a runtime memory.

The processor may be configured to, when an operation amount of the determined recognition model is equal to or greater than a first operation value, assign the determined recognition model to a computing unit, from among the plurality of computing units, having an operation speed equal to or greater than a second operation value, and when the operation amount of the determined recognition model is less than the first operation value, assign the determined recognition model to a computing unit, from among the plurality of computing units, having an operation speed less than the second operation value.

The processor may be configured to divide the space into a first subset space classified as a first group and a second subset space classified as a second group, based on the object information, determine a second recognition model, from among the recognition models corresponding to the first group, as the recognition model to be used in the first subset space, based on characteristics of the first subset space, and determine a third recognition model, from among the recognition models corresponding to the second group, as the recognition model to be used in the second subset space, based on characteristics of the second subset space.

The processor may be configured to assign the second recognition model to a first computing unit from among the plurality of computing units and assign the third recognition model to a second computing unit, based on the characteristic information of each of the plurality of computing units, characteristic information of the second recognition model, and characteristic information of the third recognition model, and control an object recognition to be performed in the first subset space by using the first computing unit and the second recognition model, and control an object recognition to be performed in the second subset space by using the second computing unit and the third recognition model.

The electronic device further includes a communicator, and the processor may be configured to control the communicator to transmit, to an external device, a request for recognition models corresponding to the characteristic information of the plurality of computing units and the first group and the second group, and to receive, from the external device, the recognition models corresponding to the first group and the second group, and store the received recognition models in the memory. The recognition models corresponding to the first group and the second group received from the external device may be determined based on the characteristic information of the plurality of computing units.

In accordance with another aspect of the disclosure, an operating method of an electronic device recognizing an object is provided. The operating method includes obtaining object information about one or more objects by recognizing the one or more objects existing in a certain space by using a first recognition model from among the plurality of recognition models, dividing the space into a plurality of subset spaces based on the object information, determining at least one recognition model to be used in each of the subset spaces, from among the plurality of recognition models, based on characteristic information of each of the subset spaces, assigning the determined recognition model to one of the plurality of computing units, based on characteristic information of each of the plurality of computing units and characteristic information of the determined recognition model, and performing object recognition by using the determined recognition model and the computing unit to which the determined recognition model is assigned, in each of the subset spaces.

An electronic device according to an embodiment may effectively use a plurality of computing units by determining an object recognition model that is to be used for each space, and assigning the object recognition model determined for each space to one of the plurality of computing units according to performances of the plurality of computing units.

Accordingly, the computing unit used for each space is effectively controlled, and thus, power consumption for performing object recognition may be minimized.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the description is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be further understood that the terms "comprises" and/or "comprising," when used in this specification, specify the presence of stated components, but do not preclude the presence or addition of one or more components. In addition, the terms such as " . . . unit," "module," etc. provided herein indicates a unit performing at least one function or operation, and may be realized by hardware, software, or a combination of hardware and software.

In the specification, the term "user" refers to a person who controls a system, a function, or an operation, and may include a developer, a manager, or an installation engineer.

Figure 1A:
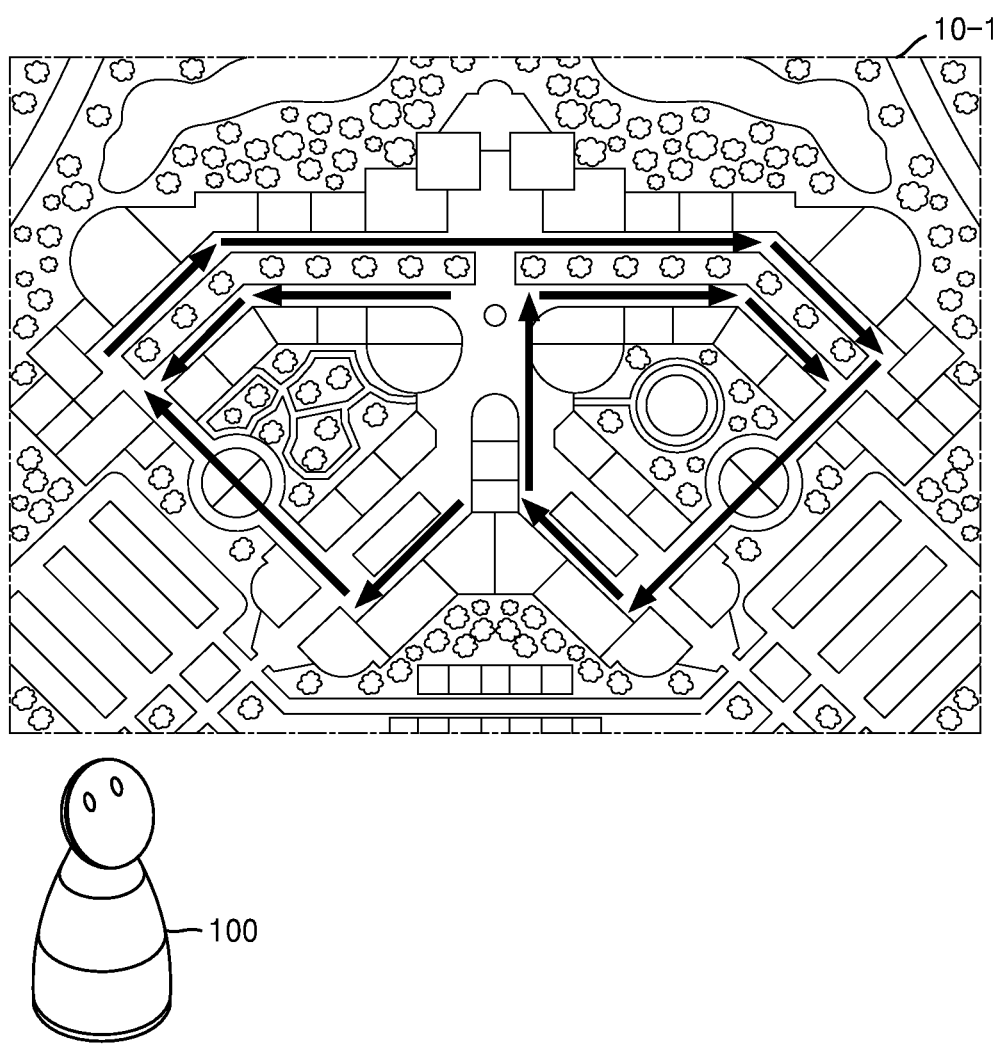
FIGS. 1A, 1B, and 1C are diagrams illustrating a method of, by an electronic device, generating a space map of a certain space and dividing the space into a plurality of subset spaces according to various embodiments of the disclosure.
Figure 1B:
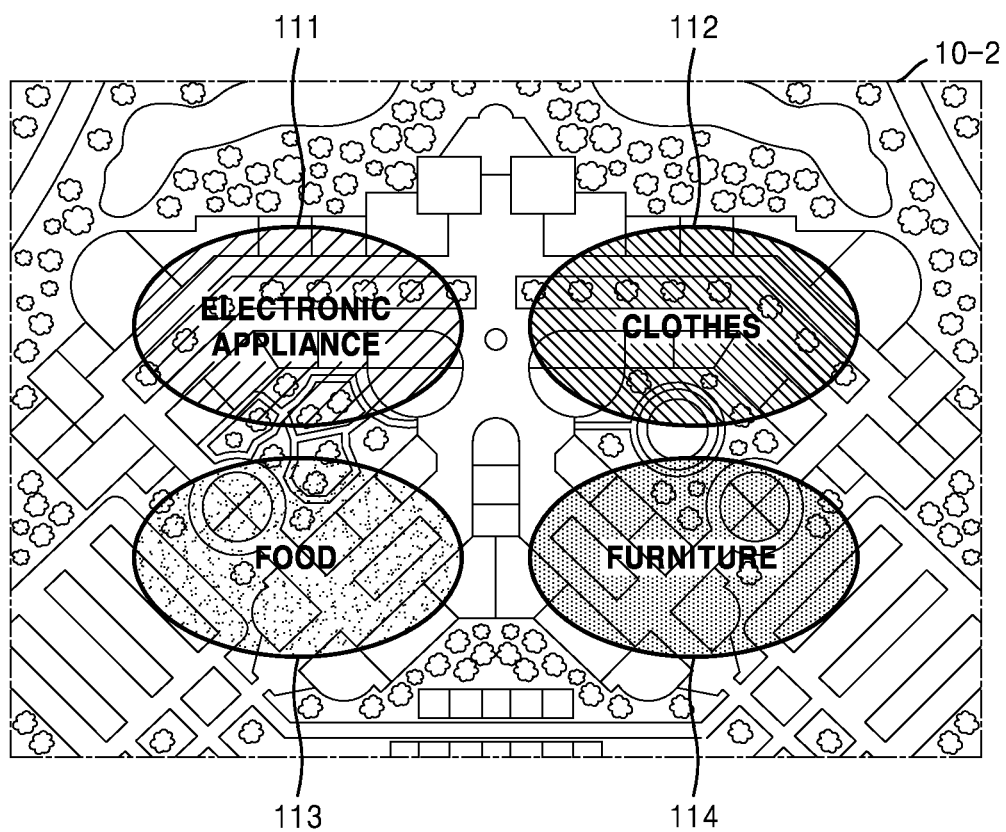
Figure 1C:
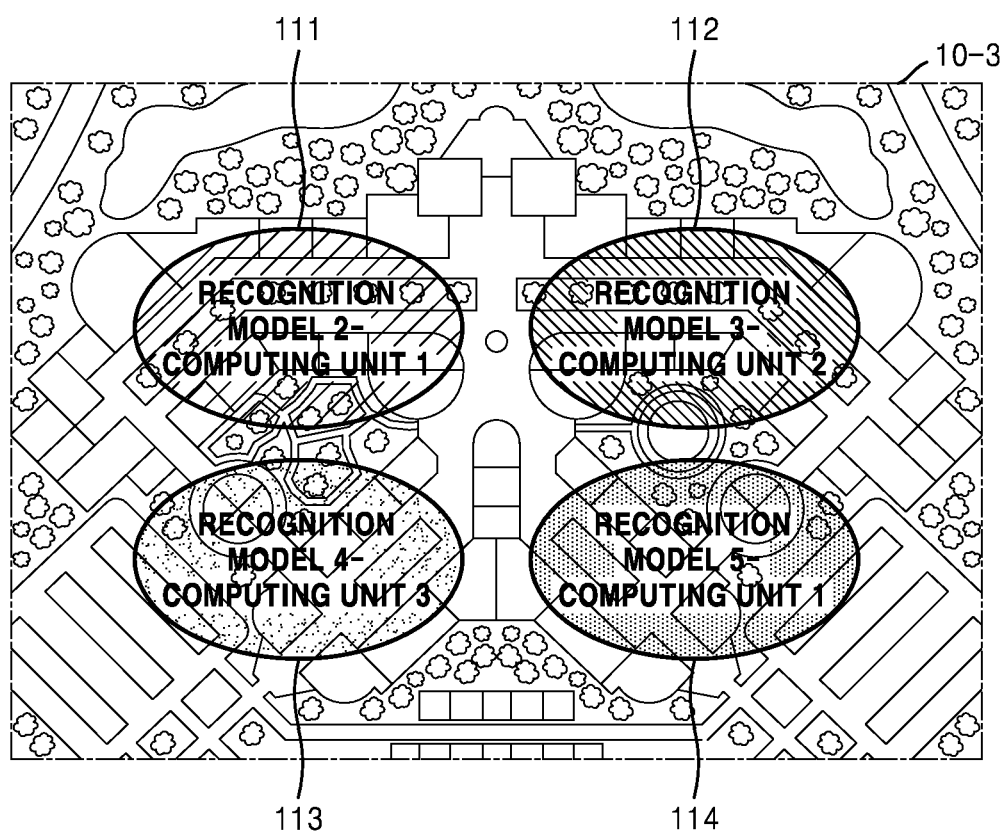

FIGS. 1A, 1B, and 1C are diagrams illustrating a method of, by an electronic device, generating a space map of a certain space and dividing the space into a plurality of subset spaces according to various embodiments of the disclosure.

An electronic device 100 according to an embodiment may include a robot device capable of performing various functions while moving in a certain space. For example, the electronic device 100 may include, but is not limited to, a robot cleaner performing a cleaning function, a retail-bot capable of performing shopping or serving function, a guide-bot capable of performing a guide function, a porter-bot capable of transporting luggage, etc. Also, the electronic device 100 according to the embodiment may include a device that may move by itself via wheels, etc., and may explore a certain space and generate a space map by using at least one sensor. Here, the certain space may denote a space in which the electronic device 100 may substantially move, and various spaces may be defined according to functions performed by the electronic device 100. Hereinafter, for convenience of description, a 'shopping mall' will be described as an example.

Referring to FIG. 1A, an electronic device 100 may explore a spatial structure of a shopping mall by using at least one sensor while moving through the shopping mall. For example, as shown in FIG. 1A, the electronic device 100 moves through the shopping mall along paths indicated by arrows, and the electronic device 100 explores (scans) the space by using a camera, an ultrasound sensor, a Lidar sensor, an obstacle sensor, etc. and obtains spatial structure information of the shopping mall. However, the path indicated by the arrow in FIG. 1A is an example, and the spatial structure information of the shopping mall may be obtained through various paths. The electronic device 100 may generate a space map 10-1 of the shopping mall, based on the obtained spatial structure information.

Also, the electronic device 100 may obtain the space map 10-1 of the shopping mall from an external device connected thereto. For example, the electronic device 100 may receive the space map from a server connected thereto or another robot device existing around, but is not limited thereto.

Also, the electronic device 100 according to the embodiment may store a plurality of recognition models. The electronic device 100 may receive the plurality of recognition models from an external device (e.g., server) and store the recognition models in a memory, and the plurality of recognition models stored in the memory may be updated. The plurality of recognition models according to the embodiment may denote models for performing object recognition on one or more objects.

According to an embodiment, 'object recognition' may denote obtaining information about object (object information) from an image of the object. The 'object information' may include position information of the object as to a position of the object in the image and classification information of the object (e.g., class information), etc. Therefore, in the disclosure, 'object recognition' is a concept including 'object detection' that indicates finding of the object position in the image.

Also, according to an embodiment, 'recognition model' may include, but is not limited to, an artificial intelligence (AI) model including one or more neural networks that are trained to receive an image of an object as input data, perform an object recognition on one or more objects included in the image, and obtain object information.

The electronic device 100 according to the embodiment detects objects existing in the space by using a first recognition model from among the plurality of recognition models while moving the entire space (e.g., entire shopping mall), and obtains object information about the detected objects (e.g., position information and classification information of the objects).

Also, the electronic device 100 according to the embodiment may divide the space into a plurality of subset spaces, based on the obtained object information. For example, the electronic device 100 may classify the space logically, based on the position information of the objects recognized from the entire space and classification information of the recognized objects.

For example, as shown in a space map 10-2 of FIG. 1B, a space in which objects recognized as "electronic appliances" exist in a certain ratio or greater may be classified as a first subset space 111, a space in which objects recognized as "clothes" exist in a certain ratio or greater may be classified as a second subset space 112, a space in which objects recognized as "food products" exist in a certain ratio or greater may be classified as a third subset space 113, and a space in which objects recognized as "furniture" exist in a certain ratio or greater may be classified as a fourth subset space 114. However, in FIG. 1B, the entire space is divided as four subset spaces for convenience of description, but is not limited thereto. That is, the entire space may be divided into a variety number of subset spaces.

A method for the electronic device 100 of dividing the entire space into a plurality of subset spaces will be described in detail later with reference to FIGS. 4 to 7.

The electronic device 100 according to the embodiment may determine a recognition model that is to be used in each of the plurality of subset spaces. As shown in a space map 10-3 of FIG. 1C, in the first subset space 111 classified as "electronic appliances" group, the object recognition may be carried out by using a second recognition model (recognition model 2) that may classify sub-classes of the electronic appliances. For example, the second recognition model (recognition model 2) may classify the objects as televisions (TVs), refrigerators, gas stoves, ovens, washers, dryers, cleaners, computers, etc. that are sub-classes of the electronic appliances, but is not limited thereto.

Also, the second subset space 112 classified as the "clothes" group, the object recognition may be carried out by using a third recognition model (recognition model 3) that may classify clothes into sub-classes. For example, the third recognition model (recognition model 3) may classify the objects as suits, casual, athletic clothes, hiking clothes, swim suits, children's clothes, shoes, hats, glasses, etc. that are sub-classes of the clothes.

Also, the third subset space 113 classified as "food products" group, the object recognition may be carried out by using a fourth recognition model (recognition model 4) that may classify the food products as sub-classes. For example, the fourth recognition model (recognition model 4) may classify the objects into meat, fish, fresh produce, fruits, processed food, etc. that are the sub-classes of the food products, but is not limited thereto.

Also, the fourth subset space 114 classified as "furniture" group, the object recognition may be carried out by using a fifth recognition model (recognition model 5) that may classify the objects as sub-classes of furniture. For example, the fifth recognition model (recognition model 5) may classify the objects as beds, tables, sofa, desks, chairs, shelves, closets, etc., but is not limited thereto.

The electronic device 100 according to the embodiment does not physically divide the space based on the structural information, but may logically divide the space based on object information about the objects existing in the space. Also, the electronic device 100 according to the embodiment may perform the object recognition effectively by performing the object recognition in more detail according to the characteristics of divided spaces by using the recognition models (e.g., the second to firth recognition models) having sub-classes of the divided spaces. The second to fifth recognition models used respectively in the plurality of subset spaces may have fewer recognizable kinds (number) of objects, but higher accuracy, as compared with the first recognition model that is used to obtain the object information from the entire space.

The electronic device 100 according to the embodiment may include a plurality of computing units. The plurality of computing units may include a graphic processing unit (GPU), a neural processing unit (NPU), etc.

The plurality of computing units may have different characteristic information, and the characteristic information of the computing unit may include operation speed of the computing unit. For example, the operation speed of the computing unit may indicate the number of calculations that may be processed per unit time. When the computing unit is implemented as a GPU, the characteristic information of the computing unit may include floating operations per second (FLOPS), and when the computing unit is implemented as an NPU, the characteristic information of the computing unit may include operations per second (OPS), but is not limited thereto.

The electronic device 100 according to the embodiment may assign at least one recognition model that is used in each of the plurality of subset spaces to one of the plurality of computing units, based on the characteristic information of the plurality of computing units and characteristic information of the recognition model. For example, when the second recognition model (recognition model 2) is determined as the recognition model to be used in the first subset space 111, the characteristic information of the second recognition model (recognition model 2) (for example, the number of classes that may be recognized by the second recognition model (recognition model 2), operation amount of the second recognition model (recognition model 2), runtime memory, etc.) and the characteristic information (operation speed) of each of the plurality of computing units, the second recognition model (recognition model 2) may be assigned to a first computing unit (computing unit 1). Here, when the operation amount and the runtime memory of the second recognition model (recognition model 2) are large, the first computing unit (computing unit 1) may be a computing unit (high-end) having relatively faster operation speed from among the plurality of computing units. Alternatively, when the operation amount and the runtime memory of the second recognition model (recognition model 2) are small, the first computing unit (computing unit 1) may be a computing unit (low-specification) having relatively slower operation speed from among the plurality of computing units.

Also, the electronic device 100 may assign each of the third to fifth recognition models to each of the second subset space 112, the third subset space 113, and the fourth subset space 114 in the same manner as that of the first subset space 111.

The electronic device 100 according to the embodiment may effectively perform the object recognition by using the recognition model determined for each of the plurality of subset spaces and the assigned computing unit. For example, the electronic device 100 may load the second recognition model (recognition model 2) onto the first computing unit (computing unit 1) while moving through the first subset space 111 to perform the object recognition, and may load the third recognition model (recognition model 3) to the second computing unit (computing unit 2) while moving through the second subset space 112 to perform the object recognition. Also, the electronic device 100 may load the fourth recognition model (recognition model 4) onto the third computing unit (computing unit 3) while moving through the third subset space 113 to perform the object recognition, and may load the fifth recognition model (recognition model 5) onto the first computing unit (computing unit 1) while moving through the fourth subset space 114 to perform the object recognition.

Figure 2:
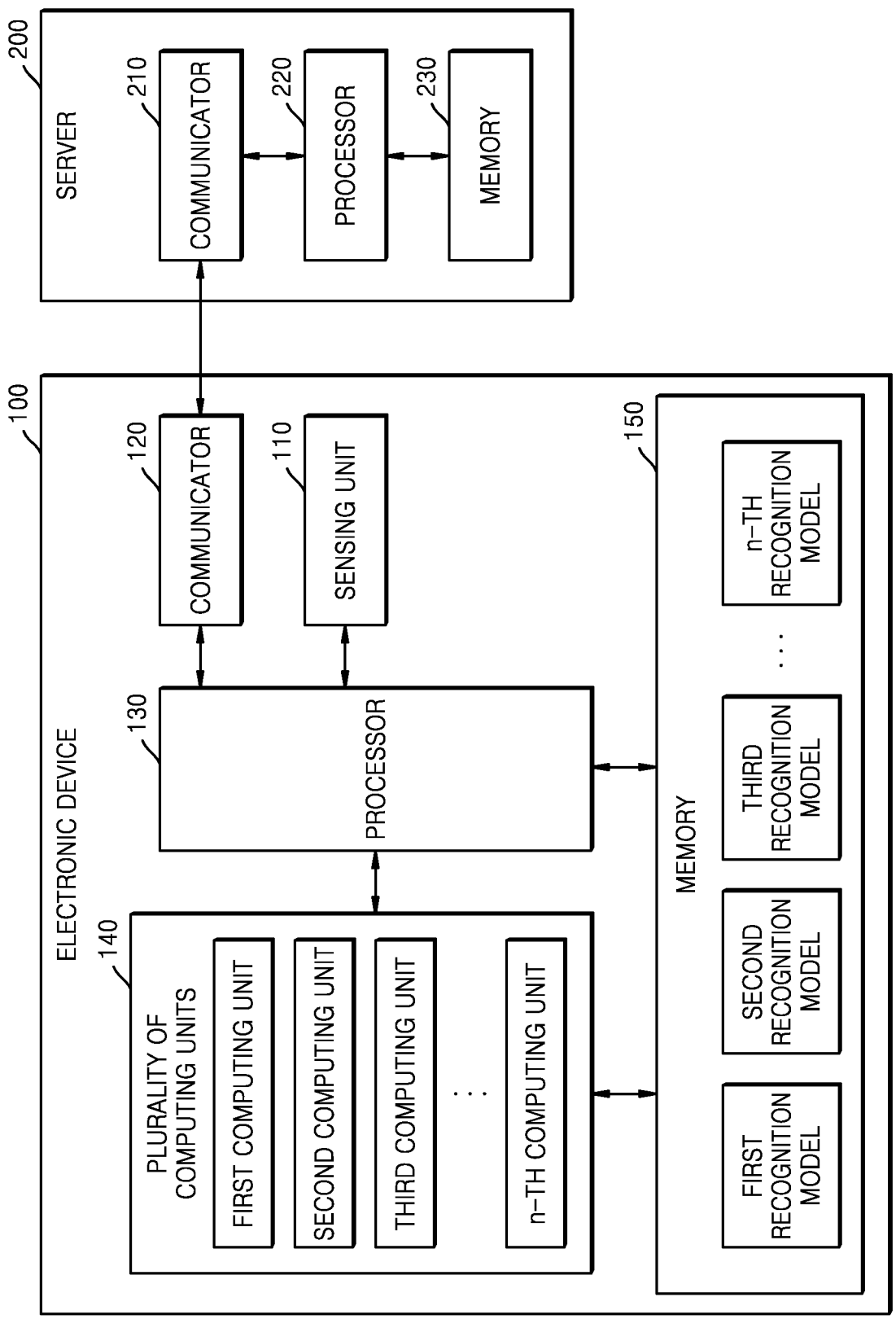
FIG. 2 is a block diagram showing an electronic device recognizing an object and a server, according to an embodiment of the disclosure.

FIG. 2 is a block diagram of an electronic device recognizing an object and a server, according to an embodiment of the disclosure.

Referring to FIG. 2, an electronic device 100 according to an embodiment may include a sensing unit 110, a communicator 120, a processor 130, a plurality of computing units 140, and a memory 150.

The sensing unit 110 may include various sensors configured to sense information about peripheral environment of the electronic device 100. For example, the sensing unit 110 may include an image sensor (camera), an infrared-ray sensor, an ultrasound sensor, a Lidar sensor, an obstacle sensor, etc., but is not limited thereto. For example, the sensing unit 110 may obtain spatial structure information of a certain space by using at least one from the camera, the ultrasound sensor, and the Lidar sensor.

The communicator 120 may transmit/receive data or signals to/from an external device (e.g., sever) according to the control of the processor 130.

The communicator 120 may include a short-range wireless communication unit, a mobile communicator, etc. in response to the performance and structure of the electronic device 100, but is not limited thereto.

The short-range wireless communication unit may include, but is not limited to, a Bluetooth communicator, a Bluetooth low energy (BLE) communicator, a near field communication unit, a wireless local area network (WLAN) wireless fidelity (Wi-Fi) communicator, a ZigBee communicator, an infrared-ray data association (IrDA) communicator, a Wi-Fi direct (WFD) communicator, an ultra wideband (UWB) communicator, an Ant+ communicator, a microwave (μWave) communicator, etc.

The mobile communicator may transmit/receive a wireless signal to/from at least one from a base station, an external terminal, and a server on a mobile communication network. Here, the wireless signal may include a voice call signal, a video call signal, or various types of data according to transmission/reception of texts/multimedia messages.

The communicator 120 according to the embodiment may request a recognition model from a server 200 and may receive the recognition model from the server. For example, the communicator 120 may transmit to the server 200 the characteristic information of each of the plurality of subset spaces and information about the plurality of computing units. The communicator 120 may request and receive the recognition models that may be processed in the plurality of computing units from the server, based on the characteristic information of each of the plurality of subset spaces.

The processor 130 according to the embodiment may perform overall operations of the electronic device 100. The processor 130 according to the embodiment may execute one or more programs stored in the memory 150. The processor 130 according to the embodiment may include an existing application processor (AP), a computing processing unit (CPU), etc.

The plurality of computing units 140 according to the embodiment may include a GPU, an NPU, etc. Each of the plurality of computing units may execute at least one of the plurality of recognition models stored in the memory 150. The plurality of computing units 140 may have different characteristic information (operation speed), but are not limited thereto.

The memory 150 may store various data, programs, or applications for driving and controlling the electronic device 100. The program stored in the memory 150 may include one or more instructions. The program (one or more instructions) stored in the memory 150 or application may be executed by the processor 130.

The memory 150 according to the embodiment may include a storage medium of at least one type of a flash memory type, a hard disk type, a multimedia card micro type, a card type memory (e.g., an secure digital (SD) or extreme digital (XD) memory, etc.), random access memory (RAM), a static RAM (SRAM), a read-only memory (ROM), an electrically erasable programmable ROM (EE-PROM), a programmable (PROM), a magnetic memory, a magnetic disk, and an optical disk. Also, the electronic device 100 may manage a Web storage or a cloud server performing a storage function on Internet.

The memory 150 according to the embodiment may store the plurality of recognition models. The plurality of recognition models may be received from the server 200. The first recognition model from among the plurality of recognition models may be a model performing the object recognition on the entire space, but is not limited thereto.

The processor 130 may load the first recognition model stored in the memory 150 on one of the plurality of computing units 140, and execute the first recognition model to perform the object recognition on the entire space and obtain the object information. Here, the processor 130 may execute the first recognition model by using one having the fastest operation speed from among the plurality of computing units, but is not limited thereto.

The processor 130 may divide the entire space into a plurality of subset spaces based on the object information. The processor 130 may logically classify the space, based on the position information of the objects recognized from the entire space and classification information of the recognized objects. This will be described in detail later with reference to FIGS. 4 to 7.

The processor 130 according to the embodiment may determine, from among the plurality of recognition models, the recognition model that is to be used in each of the plurality of subset spaces based on characteristic information of each subset space. Based on the characteristic information of the determined recognition model and the characteristic information of each of the plurality of computing units 140 (first to n-th computing units), the processor 130 may assign the determined recognition model to one of the plurality of computing units 140 (first to n-th computing units).

The processor 130 may control the plurality of computing units 140 to perform the object recognition in each of the plurality of subset spaces, by using the determined recognition model and the computing unit assigned to the determined recognition model. For example, when the second recognition model is determined as the recognition model to be used in the first subset space and the first computing unit is assigned to the second recognition model, the processor 130 loads the second recognition model onto the first computing unit and controls the second recognition model to perform the object recognition while the electronic device 100 moves through the first subset space.

The server 200 according to the embodiment may include a communicator 210, a processor 220, and a memory 230.

The communicator 210 may include one or more elements allowing communication through a local area network (LAN), a wide area network (WAN), a value added network (VAN), a mobile radio communication network, a satellite communication network, and a combination thereof.

The communicator 210 according to the embodiment may receive, from the electronic device 100, a request for the recognition model and may transmit the requested recognition model to the electronic device 100.

The processor 220 according to the embodiment may control the server 200. The processor 220 according to the embodiment may execute one or more programs stored in the memory 230.

The memory 230 according to the embodiment may various data, programs, or applications for driving and controlling the server 200. The program stored in the memory 230 may include one or more instructions. The program (one or more instructions) stored in the memory 230 or application may be executed by the processor 220.

The processor 220 may generate a plurality of recognition models recognizing the object. The processor 220 may train the recognition model including one or more neural networks to recognize the object by using learning data. Also, the plurality of recognition models may be trained by using different learning data so that the kinds and the number of classifiable classes respectively by the plurality of recognition models may be different from one another. For example, the trained first recognition model may include a model capable of classifying objects as upper classes, e.g., electronic appliances, clothes, furniture, food, toys, cosmetics, etc., and the trained second recognition model may include a model capable of classifying objects as lower classes of the electronic appliances, e.g., TVs, refrigerators, gas stoves, ovens, washers, dryers, cleaners, computers, etc.

The memory 150 according to the embodiment may store the plurality of recognition models that have been trained.

Figure 3:
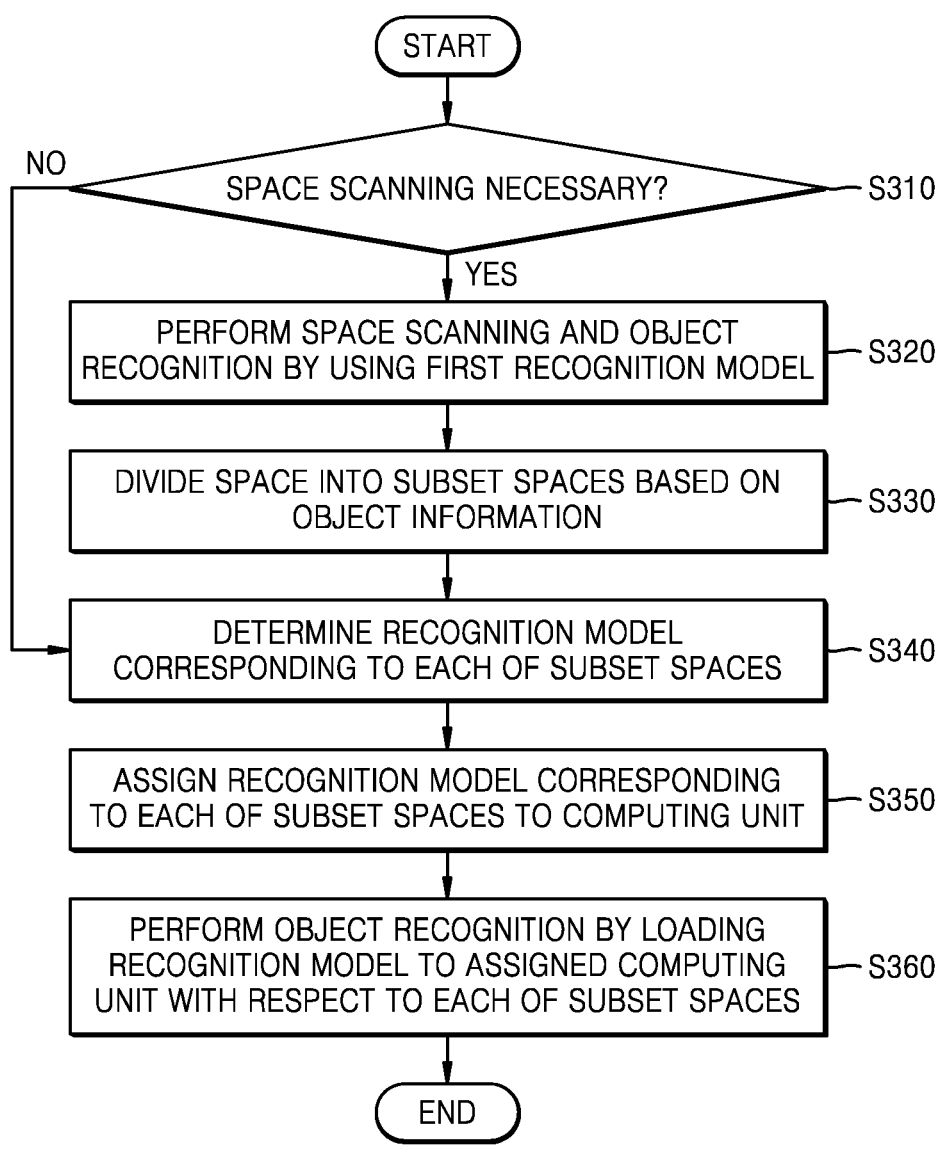
FIG. 3 is a flowchart illustrating an operating method of an electronic device according to an embodiment of the disclosure.

FIG. 3 is a flowchart illustrating an operating method of an electronic device according to an embodiment of the disclosure.

Referring to FIG. 3, the electronic device according to the embodiment may determine whether a space needs to be scanned, at operation S310.

For example, the electronic device 100 may determine whether the space scanning is necessary, for example, spatial structure information of a certain space is not obtained (initial scan), there is a structural change in the space, and purpose of the space is changed, etc.

The electronic device 100 according to the embodiment may scan the space structure by using at least one sensor while moving through the space when the space scanning is necessary, and may perform the object recognition on one or more objects existing in the space to obtain object information by using the first recognition model, at operation S320.

The electronic device 100 according to the embodiment may divide the space into a plurality of subset spaces, based on the obtained object information, at operation S330.

For example, the electronic device 100 may logically divide the space based on the object information (for example, position information and classification information of objects) of the objects recognized from the entire space. This will be described in detail later with reference to FIGS. 4 to 7.

FIGS. 4, 5, 6, and 7 are diagrams referred to describe a method of dividing an entire space into a plurality of subset spaces, according to various embodiments of the disclosure.

Figure 4:
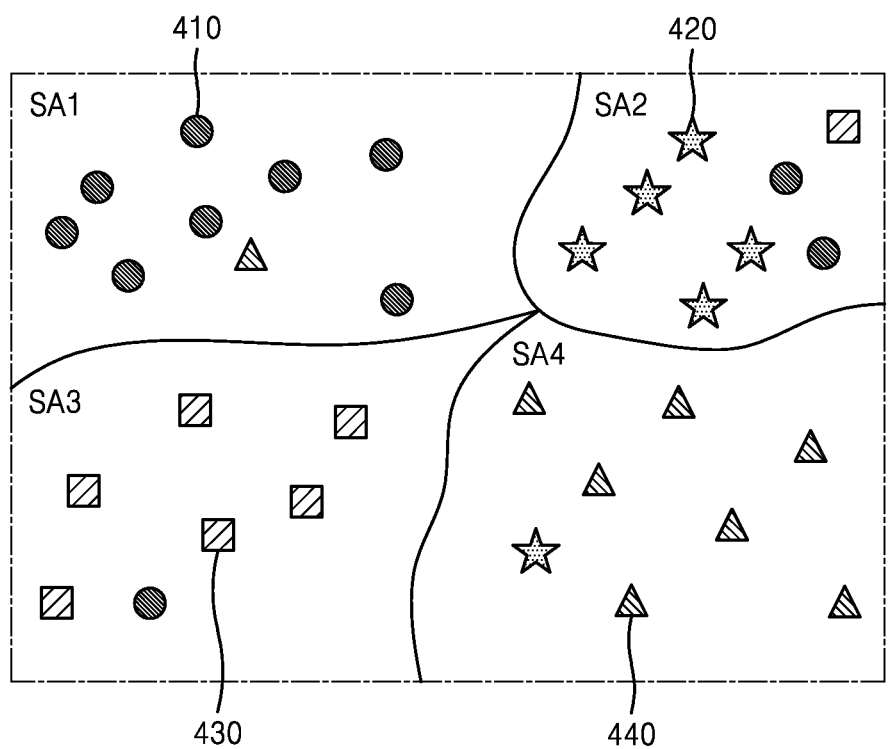
FIGS. 4, 5, 6, and 7 are diagrams referred to describe a method of dividing an entire space into a plurality of subset spaces, according to various embodiments of the disclosure.

Referring to FIG. 4, the object information obtained by the electronic device 100 according to the embodiment by using the first recognition model may be displayed on a space map of the entire space. Here, positions of marks displayed on the map may be determined based on the position information of the recognized objects included in the object information. Also, shapes of the marks may be determined according to classification information (e.g., kinds) of the recognized objects included in the object information. In FIG. 4, for convenience of description, an object classified as 'electronic appliance' is indicated as a mark 410 having a circular shape, an object classified as 'clothes' is indicated as a mark 420 having a star shape, an object classified as 'food' is indicated as a mark 430 having a square shape, and an object classified as 'furniture' is indicated as a mark 440 having a triangular shape.

Referring to FIG. 4, when an electronic device 100 recognizes an object classified as 'electronic appliance' at a first position by using the first recognition model, the mark 410 having the circular shape may be displayed on the first position. Also, when the electronic device 100 recognizes an object classified as 'clothes' at a second position by using the first recognition model, the mark 420 having the star shape may be displayed on the second position. Also, when the electronic device 100 recognizes an object classified as 'food' at a third position by using the first recognition model, the mark 430 having the square shape may be displayed on the third position. Also, when the electronic device 100 recognizes an object classified as 'furniture' at a fourth position by using the first recognition model, the mark 440 having the triangular shape may be displayed on the fourth position.

The electronic device 100 according to the embodiment may divide the entire space into the plurality of spaces so that the objects recognized as the same kind may exist by a certain ratio or greater. Also, the electronic device 100 may determine a shape and an area of each of the plurality of subset spaces, and boundaries among the plurality of subset spaces, etc. by using various algorithms or neural network models.

Referring to FIG. 4, the electronic device 100 may divide the entire space into first to fourth subset spaces SA1, SA2, SA3, and SA4. In the first subset space SA1, objects recognized as 'electronic appliances' exist in a certain ratio or greater, in the second subset space SA2, objects recognized as 'clothes' exist in a certain ratio or greater, in the third subset space SA3, objects recognized as 'food' exist in a certain ratio or greater, and in the fourth subset space SA4, objects recognized as 'furniture' may exist in a certain ratio or greater.

Figure 5:
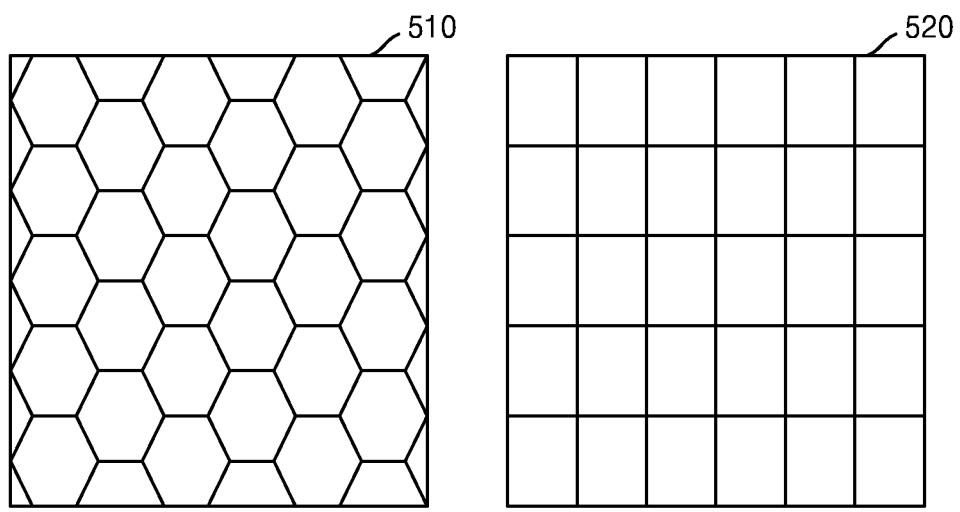

Referring to FIG. 5, the entire space according to the embodiment may be divided into sub-spaces formed in polygonal shapes. For example, the entire space may be divided into sub-spaces formed in hexagonal shapes as shown in 510 of FIG. 5, or may be divided into sub-spaces formed in square shapes as shown in 520 of FIG. 5. The sub-spaces may have various shapes other than the polygonal shape.

The electronic device 100 according to the embodiment may determine the plurality of subset spaces based on the object information obtained from each of the sub-spaces.

Figure 6:
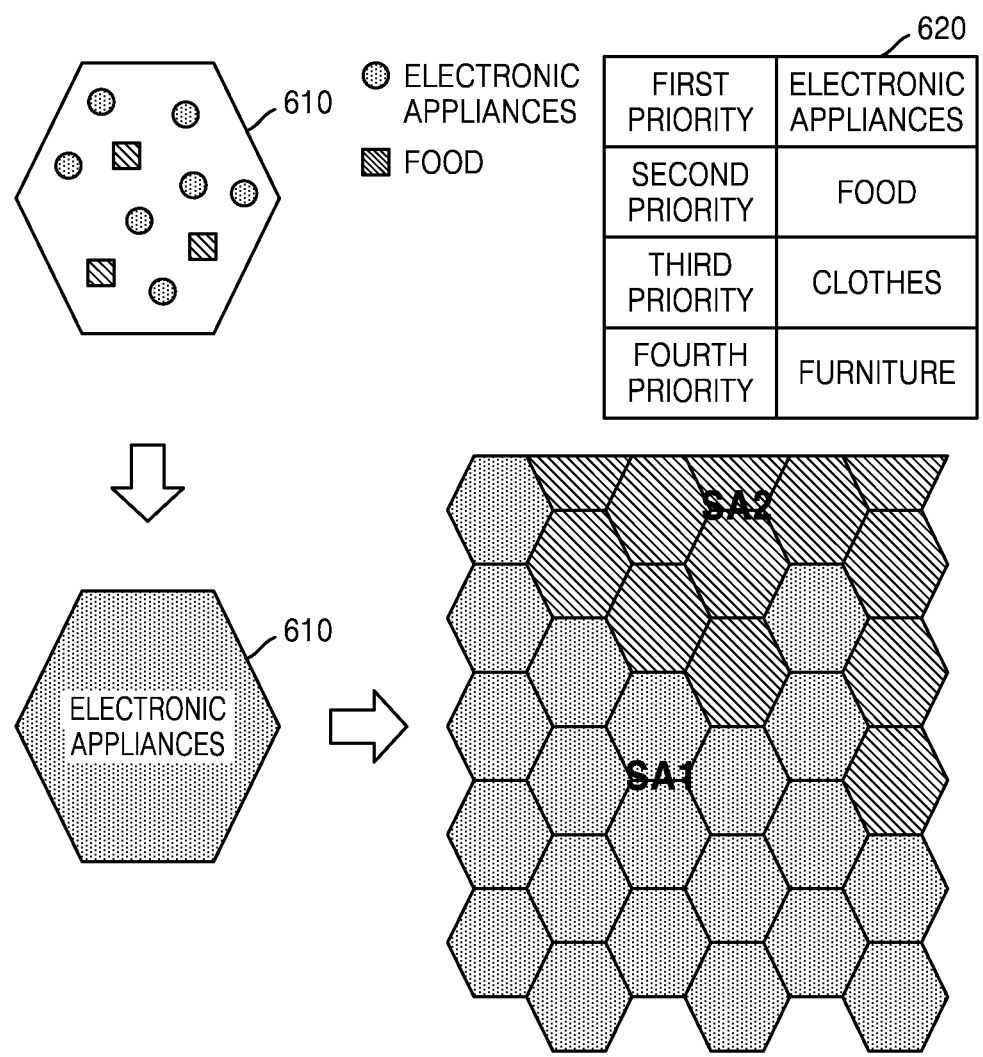

Referring to FIG. 6, an electronic device 100 may determine the classification information (kind) having the largest number as the characteristic information of the corresponding sub-space, based on the number per classification information (kind) of the objects recognized from each of the sub-spaces. For example, when the objects recognized from a first sub-space 610 include seven electronic appliances and three pieces of food, the electronic device 100 may determine the first sub-space 610 as a space corresponding to the 'electronic appliance'.

Also, when there are a plurality of pieces of classification information having the largest number, the electronic device 100 may determine the characteristic information of the sub-space based on priority order information. For example, when the objects recognized in the first sub-space 610 include five electronic appliances and five pieces of food, the 'electronic appliance' is prior to the 'food' according to priority order information 620, and thus, the electronic device 100 may determine the first sub-space 610 as a space corresponding to the 'electronic appliance'.

In the same manner, the electronic device 100 may determine the characteristic information with respect to each of the plurality of sub-spaces, and may determine sub-spaces having the same characteristic information as one subset space. For example, as shown in FIG. 6, the sub-spaces having the characteristic information of 'electronic appliance' are determined as the first subset space SA1, and the sub-spaces having the characteristic information of 'food' may be determined as the second subset space SA2.

Figure 7:
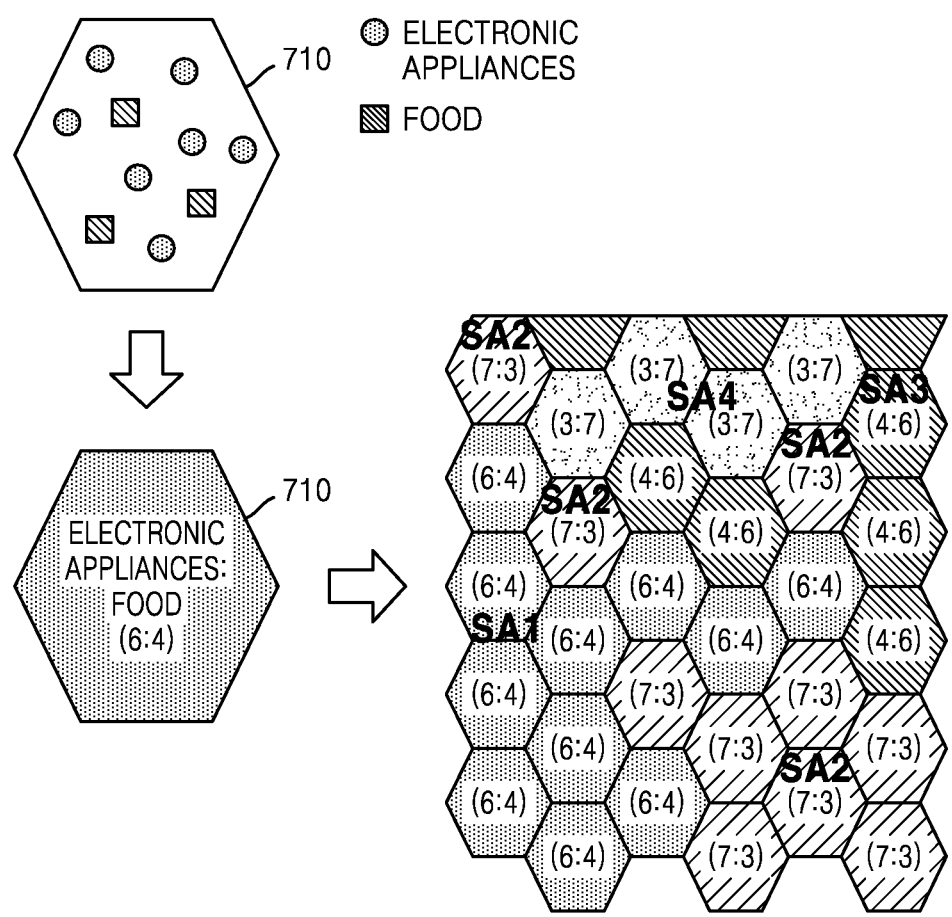

Referring to FIG. 7, an electronic device 100 may determine the characteristic information of the corresponding sub-space based on a ratio between the classification information (kinds) of the objects recognized from each of the sub-spaces. For example, when the objects recognized from a first sub-space 710 include seven electronic appliances and three pieces of food, the electronic device 100 may determine the first sub-space 710 as a space having a ratio 7:3 between the electronic appliance and the food. Alternatively, when the objects recognized from the first sub-space 710 include six electronic appliances and four pieces of food, the electronic device 100 may determine the first sub-space 710 as a space having a ratio 6:4 between the electronic appliance and the food.

In the same manner, the electronic device 100 may determine the characteristic information with respect to each of the plurality of sub-spaces, and may determine sub-spaces having the same characteristic information as one subset space. For example, as shown in FIG. 7, the sub-spaces in which the 'electronic appliances' and the 'food' are recognized in the ratio of 6:4 may be determined as the first subset space SA1, the sub-spaces in which the 'electronic appliances' and the 'food' are recognized in the ratio of 7:3 may be determined as the second subset space SA2, the sub-spaces in which the 'electronic appliances' and the 'food' are recognized in the ratio of 4:6 may be determined as the third subset space SA3, and the sub-spaces in which the 'electronic appliances' and the 'food' are recognized in the ratio of 3:7 may be determined as the fourth subset space SA4.

In addition, in FIGS. 6 and 7, the plurality of sub-spaces are formed in the hexagonal shapes for convenience of description, but are not limited thereto, that is, the method described with reference to FIGS. 6 and 7 may be also applied to the plurality of sub-spaces having different shapes.

Referring back to FIG. 3, the electronic device 100 according to the embodiment may determine the recognition model corresponding to each of the subset spaces, at operation S340.

The electronic device 100 according to the embodiment may transmit the characteristic information of the subset spaces and the characteristic information of the computing units included in the electronic device 100 to the server, and may request the recognition model corresponding to each of the subset spaces from the server. The electronic device 100 may store the recognition models received from the server in the memory. This will be described in more detail later with reference to FIGS. 8 and 9.

Based on the characteristic information of each of the plurality of subset spaces, the electronic device 100 may determine the recognition model that is to be used in each of the plurality of subset spaces, from among the plurality of recognition models stored in in advance.

For example, when a certain number of objects or more included in the first subset space from among the plurality of subset spaces are classified as electronic appliances, the electronic device 100 may assign the recognition model (second recognition model) capable of classifying the objects as lower classes of the electronic appliances to the first subset space.

Here, there may be a plurality of recognition models capable of classifying the objects as the lower classes of the electronic appliances in the electronic device 100, and the number of classes that may be classified or recognition accuracy of the plurality of recognition models may be different from one another. The electronic device 100 may determine the recognition model that is to be used in the first subset space from among the plurality of recognition models, based on the number of objects existing in the first subset space, a ratio of the objects in the first subset space with respect to the number of objects existing in the entire space, and a ratio of the area of the first subset space with respect to the total area of the entire space, etc.

Also, when a certain number or greater objects are classified as clothes from among the objects included in the second subset space, the electronic device 100 may assign the recognition model (third recognition model) capable of classifying the objects as lower classes of 'clothes' to the second subset space.

Alternatively, when the number of objects classified as 'electronic appliances' is equal to or greater than a certain number and the number of objects classified as 'clothes' is equal to or greater than a certain number from among the objects recognized from the third subset space, the electronic device 100 may assign the second recognition model capable of classifying the objects as the lower classes of the 'electronic appliance' and the third recognition model capable of classifying the objects as the lower classes of the 'clothes' to the third subset space.

Alternatively, the electronic device 100 may assign the fourth recognition model capable of classifying the objects as the lower classes of the 'electronic appliances' and the lower classes of the 'clothes' to the third subset space, based on the ratio between the number of objects classified as the 'electronic appliances' and the number of objects classified as 'clothes' (e.g., 6:4) included in the third subset space.

For example, the electronic device 100 may transmit information about the ratio between the number of objects classified as the 'electronic appliances' and the number of objects recognized as the 'clothes' (e.g., 6:4) in the third subset space to the server, and the server may generate the trained fourth recognition model based on the ratio between the number of objects recognized as the 'electronic appliances' and the number of objects recognized as the 'clothes'. The server may transmit the fourth recognition model to the electronic device, and the electronic device may assign the fourth recognition model to the third subset space.

In the same manner, the server may generate various recognition models based on the ratio between the number of objects classified as the 'electronic appliances' and the number of objects classified as the 'clothes', and transmit the generated recognition model to the electronic device 100. In addition, the electronic device 100 may assign the recognition model according to ratio information in each of the plurality of subset spaces (a ratio of the number of kinds of the objects recognized in one subset space).

The electronic device 100 according to the embodiment may assign the determined recognition model to one of the plurality of computing units, based on the characteristic information of the computing units included in the electronic device 100 and the characteristic information of the recognition model determined with respect to each of the subset spaces, at operation S350.

For example, when the second recognition model is determined as the recognition model to be used in the first subset space from among the plurality of subset spaces, the electronic device 100 may assign the second recognition model to the first computing unit based on the characteristic information of the second recognition model (e.g., the number of classes that may be recognized by the second recognition model, operation amount of the second recognition model, runtime memory, etc.) and characteristic information (operation speed) of each of the plurality of computing units. Here, when the operation amount and the runtime memory of the second recognition model are large, the first computing unit may be a computing unit (high-end) having relatively faster operation speed from among the plurality of computing units. Here, when the operation amount and the runtime memory of the second recognition model are small, the first computing unit may be a computing unit (low-specification) having relatively slower operation speed from among the plurality of computing units.

Also, when the plurality of recognition models are assigned to one subset space, the electronic device 100 according to the embodiment may assign the plurality of recognition models to one computing unit or may assign the plurality of recognition models respectively to different computing units. For example, the third recognition model and the fourth recognition model assigned to one subset space may be both assigned to the second computing units, or the third recognition model may be assigned to the second computing unit and the fourth recognition model may be assigned to the third computing unit.

The electronic device 100 may assign the recognition model to each of the computing units in the same manner with respect to the other subset spaces.

The electronic device 100 according to the embodiment may perform the object recognition by using the recognition model determined for each of the plurality of subset spaces and the assigned computing unit, at operation S360.

For example, the electronic device 100 may perform the object recognition by loading the second recognition model onto the first computing unit while moving through the first subset space. Also, the electronic device 100 may perform the object recognition by loading the recognition model in the same manner, with respect to the other subset spaces.

Also, when the plurality of recognition models (third recognition model and fourth recognition model) assigned to one subset space (e.g., second subset space) are assigned to one computing unit (e.g., second computing unit), the electronic device 100 may perform the object recognition by loading the third recognition model onto the second computing unit and after that, may perform the object recognition by loading the fourth recognition model onto the second computing unit while moving through the second subset space.

Alternatively, when the third recognition model assigned to the second subset space is assigned to the second computing unit and the fourth recognition model is assigned to the third computing unit, the electronic device 100 may perform the object recognition in parallel by loading the third recognition model onto the second computing unit and loading the fourth recognition model onto the third computing unit while moving through the second subset space. However, one or more embodiments are not limited to the above examples.

Figure 8:
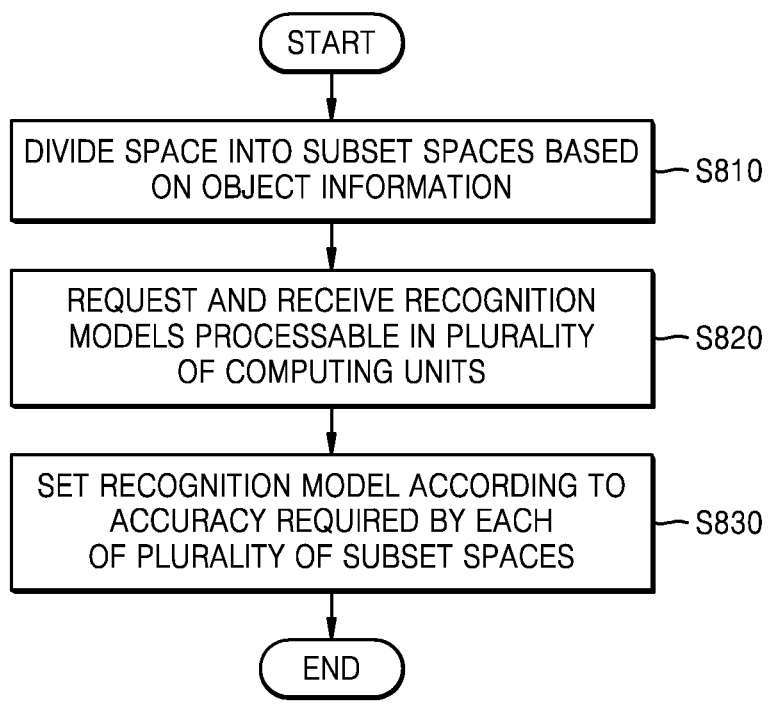
FIG. 8 is a flowchart illustrating a method of, by an electronic device, assigning a recognition model to a plurality of subset spaces, according to an embodiment of the disclosure.
Figure 9:
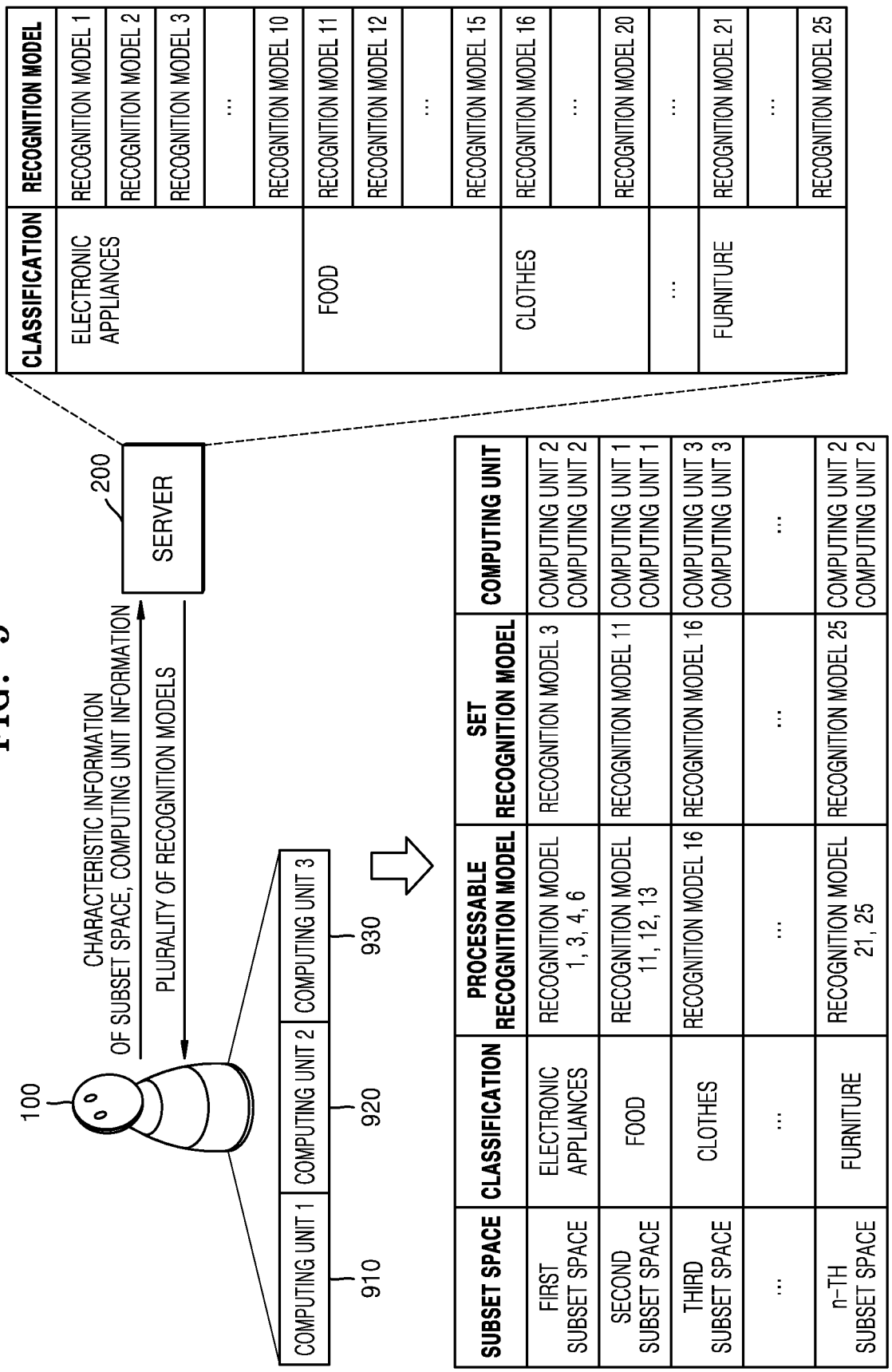
FIG. 9 is a diagram referred to describe FIG. 8 according to an embodiment of the disclosure.

FIG. 8 is a flowchart illustrating a method of, by an electronic device, assigning a recognition model to a plurality of subset spaces according to an embodiment of the disclosure, and FIG. 9 is a diagram referred to describe FIG. 8 according to an embodiment of the disclosure.

Referring to FIG. 8, an electronic device 100 according to the embodiment may divide the space into a plurality of subset spaces, at operation S810.

Operation S810 of FIG. 8 corresponds to operation S330 of FIG. 3, and detailed descriptions thereof are omitted.

The electronic device 100 according to the embodiment may request and receive, from the server, the recognition models that may be processed in the plurality of computing units, based on the characteristic information of each of the plurality of subset spaces, at operation S820.

Referring to FIG. 9, a server 200 according to the embodiment may store the plurality of recognition models. For example, the server 200 may store the recognition model 1 to recognition model 10 that may perform classification of lower classes of the 'electronic appliances'. Also, the server 200 may store recognition model 11 to recognition model 15 capable of performing classification of lower classes of 'food', recognition model 16 to recognition model 20 capable of performing classification of lower classes of the 'clothes', and recognition model 21 to recognition model 25 capable of performing classification of lower classes of the 'furniture'.

Also, the plurality of recognition models stored in the server 200 may include recognition models that are trained by using different learning data so that the kinds and the number of classifiable classes.

In addition, the electronic device 100 may transmit the characteristic information of each of the plurality of subset spaces and information about each of the plurality of computing units to the server 200.

For example, the electronic device 100 may transmit to the server 200 the characteristic information of the first subset space (e.g., information indicating that the first subset space is classified as 'electronic appliance' group) and the characteristic information of computing units 1 to 3 (e.g., computing units 910, 920, and 930 of FIG. 9) included in the electronic device 100, and may request recognition models corresponding to the first subset space. The server 200 may determine, from among the recognition models (recognition model 1 to recognition model 10) capable of classifying the lower classes of the 'electronic appliances', the recognition models (e.g., recognition models 1, 3, 4, and 6) that may be processed in the computing units 1 to 3 (e.g., computing units 910, 920, and 930 of FIG. 9), and then, transmits the recognition models to the electronic device 100. The electronic device 100 may store the recognition models received from the server 200 in the memory 150 after matching the recognition models to the first subset space.

Also, the electronic device 100 may transmit to the server 200 the characteristic information of the second subset space (e.g., information indicating that the second subset space is classified as 'food' group) and the characteristic information of the computing units 1 to 3 (e.g., computing units 910, 920, and 930 of FIG. 9) included in the electronic device 100, and may requested recognition models corresponding to the second subset space. The server 200 may determine, from among the recognition models (recognition model 11 to recognition model 15) capable of classifying the lower classes of the food, the recognition models (e.g., recognition models 11, 12, and 13 of FIG. 9) that may be processed in the computing units 1 to 3 (e.g., computing units 910, 920, and 930 of FIG. 9), and then, transmits the recognition models to the electronic device 100. The electronic device 100 may store the recognition models received from the server 200 in the memory 150 after matching the recognition models to the second subset space.

The electronic device 100 may request and receive the recognition models corresponding to each of the subset spaces from the server 200 and store the recognition models in the memory 150, in the same manner as above.

Referring back to FIG. 8, the electronic device 100 according to the embodiment may set the recognition model according to an accuracy required by each of the subset spaces, at operation S830.

For example, the electronic device 100 may set the recognition model 3, from among the recognition models (e.g., recognition models 1, 3, 4, and 6) corresponding to the first subset space stored in the memory 150, as the recognition model to be used in the first subset space according to the accuracy or the number of classes required by the first subset space. Here, the accuracy required by the first subset space may be determined based on the number of objects existing in the first subset space, a ratio of the number of objects in the first subset space with respect to the number of objects in the entire space, a ratio of the area of the first subset space with respect to the total area of the entire space, etc.

In the same manner, the electronic device 100 may set the recognition model 11 as the recognition model to be used in the second subset space, the recognition model 16 as the recognition model to be used in the third subset space, and the recognition model 25 as the recognition model to be used in an n-th subset space. However, one or more embodiments are not limited to the above examples.

Also, the electronic device 100 according to the embodiment may align the set recognition model to one of the plurality of computing units, based on the characteristic information of the recognition model set with respect to each of the subset spaces, and the characteristic information of the plurality of computing units. This is described above with reference to operation S350 of FIG. 3, and detailed descriptions thereof are omitted.

Figure 10:
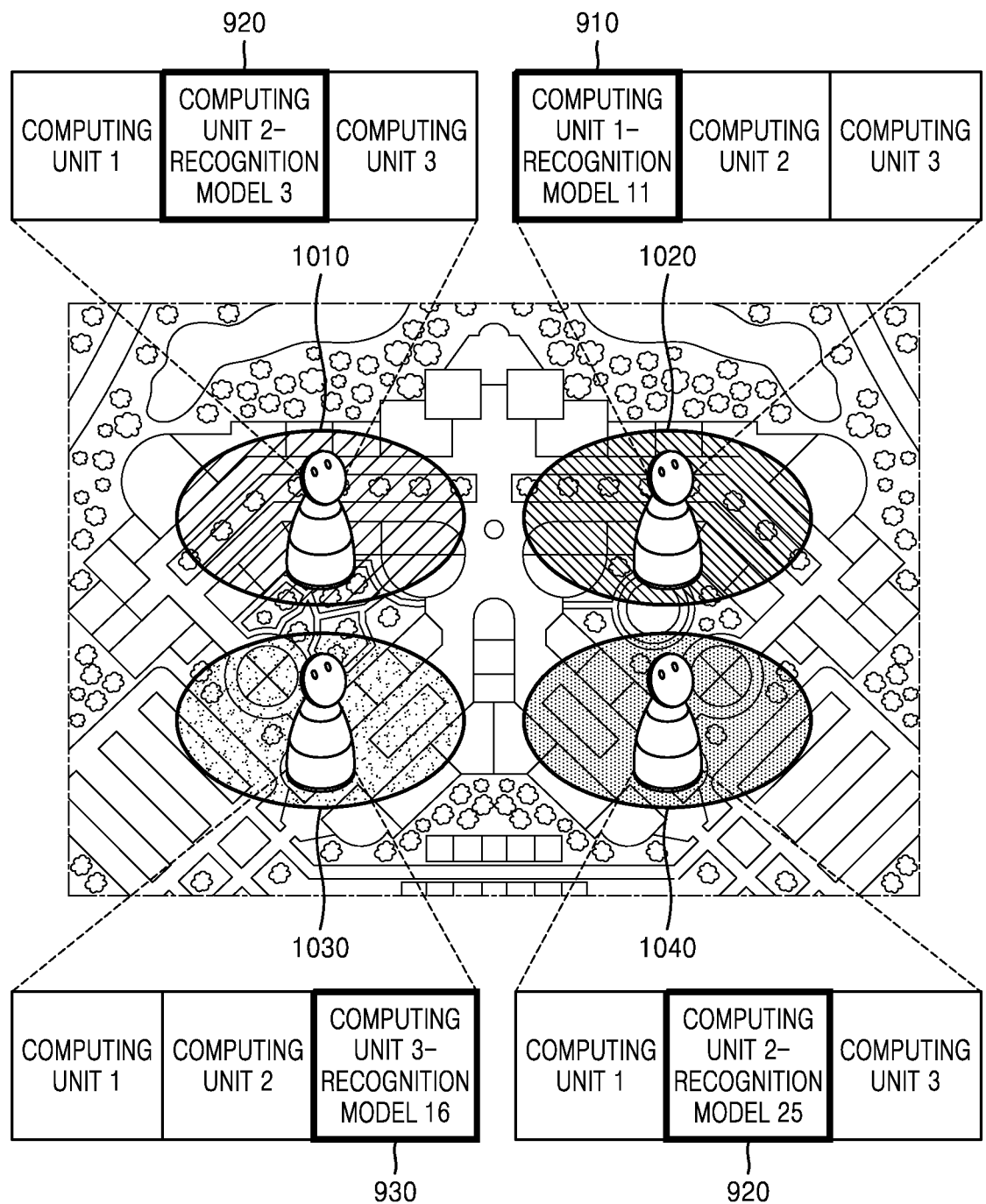
FIG. 10 is a diagram illustrating a method of, by an electronic device, performing object recognition in a plurality of subset spaces according to an embodiment of the disclosure.

FIG. 10 is a diagram illustrating a method of, by an electronic device, performing object recognition in a plurality of subset spaces according to an embodiment of the disclosure.

Referring to FIG. 10, an electronic device 100 according to the embodiment may perform the object recognition by using the recognition model determined for each of the plurality of subset spaces and the assigned computing unit.

Referring to FIG. 9, when the recognition model 3 is set as the recognition model to be used in a first subset space 1010 and the recognition model 3 is assigned to the computing unit 920, the electronic device 100 may load the recognition model 3 onto the computing unit 920 and perform the object recognition by using the recognition model 3 while moving through the first subset space.

Also, when the recognition model 11 is set as the recognition model to be used in a second subset space 1020 and the recognition model 11 is assigned to the computing unit 910, the electronic device 100 may load the recognition model 11 onto the computing unit 910 and perform the object recognition by using the recognition model 11 while moving through the second subset space 1020.

Also, when the recognition model 16 is set as the recognition model to be used in a third subset space 1030 and the recognition model 16 is assigned to the computing unit 930, the electronic device 100 may load the recognition model 16 onto the computing unit 930 and perform the object recognition by using the recognition model 16 while moving through the third subset space 1030.

Also, when the recognition model 25 is set as the recognition model to be used in an n-th subset space 1040 and the recognition model 25 is assigned to the computing unit 920, the electronic device 100 may load the recognition model 25 onto the computing unit 920 and perform the object recognition by using the recognition model 25 while moving through the n-th subset space 1040.

Figure 11:
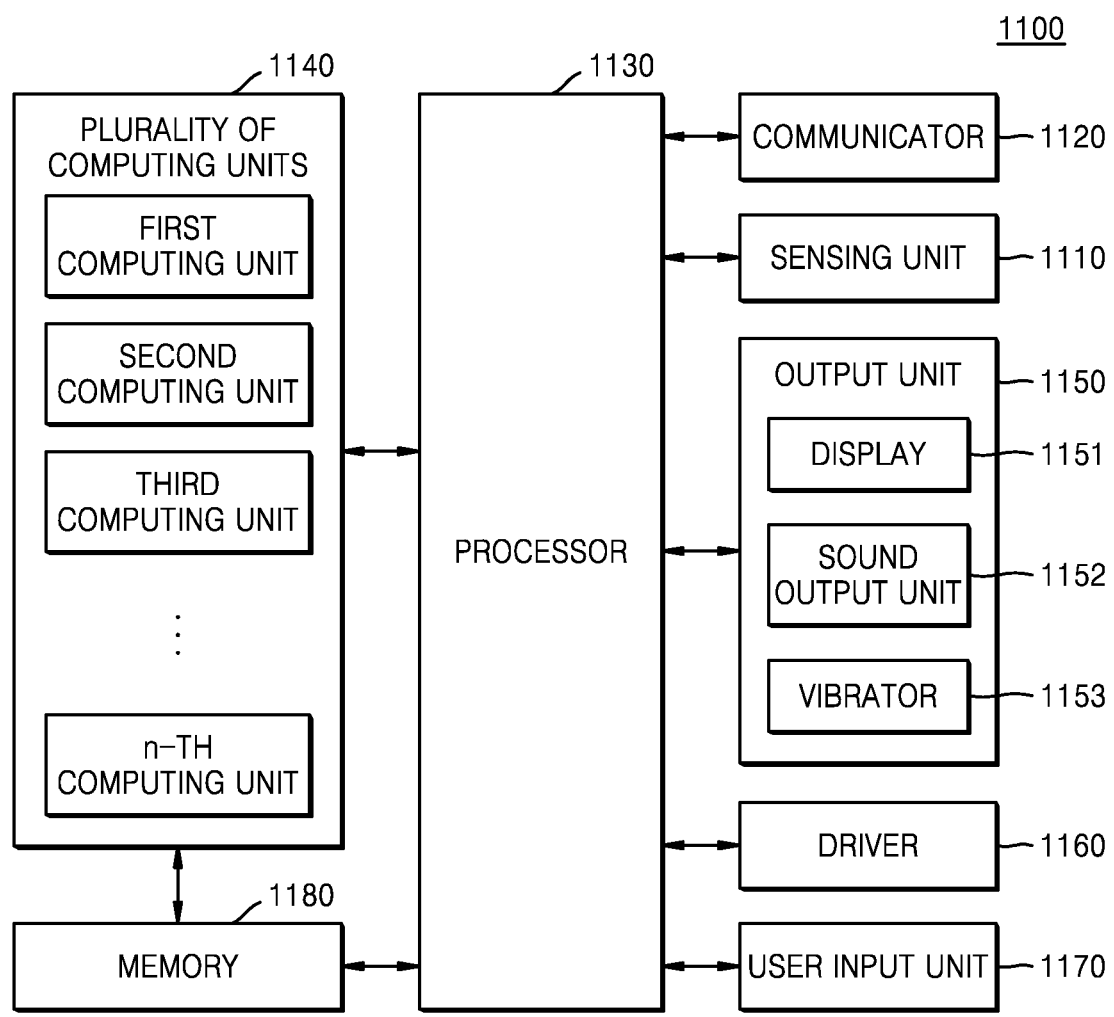
FIG. 11 is a block diagram of an electronic device according to an embodiment of the disclosure.

FIG. 11 is a block diagram of an electronic device according to an embodiment of the disclosure.

Referring to FIG. 11, an electronic device 1100 according to the embodiment may include an output unit 1150, a driver 1160, and a user input unit 1170 in addition to a sensing unit 1110, a communicator 1120, a processor 1130, a plurality of computing units 1140, and a memory 1180.

The sensing unit 1110, the communicator 1120, the processor 1130, the plurality of computing units 1140, and the memory 1180 of FIG. 11 correspond respectively to the sensing unit 110, the communicator 120, the processor 130, the plurality of computing units 140, and the memory 150 of FIG. 2, and redundant descriptions are omitted.

The output unit 1150 according to the embodiment outputs an audio signal, a video signal, or a vibration signal, and may include a display 1151, a sound output unit 1152, a vibrator 1153, etc.

The display 1151 may output and display information processed in the electronic device 1100. For example, the display 1151 may display a current position of the electronic device 1100, a current mode (e.g., information about the recognition model that is being used, etc.) of the electronic device 1100, a charged status (e.g., remaining battery amount), etc., but is not limited thereto. The display 1151 may display a user interface (UI) or a graphic user interface (GUI) regarding settings of the electronic device 1100.

In addition, when the display 1151 and a touch pad are configured as a touch screen in a layered structure, the display 1151 may be used as an input device, in addition to as an output device. The display 1151 may include at least one of a liquid crystal display, a thin film transistor-liquid crystal display, an organic light-emitting diode display, a flexible display, a three-dimensional (3D) display, or an electrophoretic display. In addition, the electronic device 1100 may include two or more displays 1151 according to an implementation thereof.

The sound output unit 1152 may output audio data transmitted from the communicator 1120 or stored in the memory 1180. Also, the sound output unit 1152 may output a sound signal regarding the functions executed in the electronic device 1100. For example, the sound output unit 1152 may include a speaker, a buzzer, etc.

The vibrator 1153 may output a vibration signal. For example, the vibrator 1153 may output a vibration signal corresponding to an output of audio data or video data (e.g., warning message, etc.).

The driver 1160 according to the embodiment may include elements that are used to drive (run) the electronic device 1100 and operate the devices in the electronic device 1100. The driver 1160 may include a running portion, etc., but is not limited thereto. The running portion may include a plurality of wheels, a motor for respectively rotating the wheels, etc., but is not limited thereto.

The user input unit 1170 according to the embodiment denotes a unit for inputting data that is used to control the electronic device 1100 from a user. For example, the user input unit 1170 may include, but is not limited to, a keypad, a dome switch, a touch pad (a capacitive overlay type, a resistive overlay type, an infrared beam type, a surface acoustic wave type, an integral strain gauge type, a piezoelectric type, etc.), a jog wheel, a jog switch, or the like.

In addition, the block diagrams of the electronic devices 100 and 1100 shown in FIGS. 2 and 11 are provided for the embodiment. Each of the elements in the block diagram may be combined, added, or omitted according to the specification of the electronic device 100 or 1100 that is actually implemented. That is, if necessary, two or more components may be combined as one or one component may be divided as two or more components. Also, functions for each block are to explain the embodiment of the disclosure of the disclosure and each specific operation or device do not limit the authority of the disclosure.

The method of operating the electronic device according to the embodiment may be recorded in non-transitory computer-readable media including program commands to implement various operations embodied by a computer. The computer-readable media may also include, alone or in combination with the program commands, data files, data structures, etc. The media and program commands may be those specially designed and constructed for the purposes, or they may be available to those of skill in the computer software arts. Examples of computer-readable media include magnetic media such as hard disks, floppy disks, and magnetic tape; optical media such as compact disc read only memory (CD ROM) disks and digital versatile disc (DVD); magneto-optical media such as floptical disks; and hardware devices that are specially to store and perform program commands, such as read-only memory (ROM), random access memory (RAM), flash memory, etc. Examples of the program commands may include machine language codes generated by a compiler and high-level language codes executable by an interpreter.

Also, the electronic device and the method of operating the electronic device according to one or more embodiments of the disclosure may be included in a computer program product. The computer program product may be traded between a seller and a buyer as a product.

The computer program product may include a software (S/W) program, or a computer-readable storage medium on which the S/W program is stored. For example, the computer program product may include a product (e.g., a downloadable app) in the form of an S/W program that is electronically distributed through a manufacturer of the electronic device or an electronic market (e.g., Google Play Store or App Store). For electronic distribution, at least a part of an S/W program may be stored in a storage medium or temporarily generated. In this case, the storage medium may include a server of a manufacturer, a server of an electronic market, or a storage medium of a relay server that temporarily stores an S/W program.

The computer program product may include a storage medium of a server or a storage medium of a client device in a system including the server and the client device. Alternatively, when there is a third device (e.g., smartphone) communicating with the server or the client device, the computer program product may include a storage medium of the third device. Alternatively, the computer program product may include an S/W program itself that is transferred from the server to the client device or the third device, or from the third device to the client device.

In this case, one of the server, the client device, and the third device may execute the computer program product to perform the method according to the embodiments of the disclosure. Alternatively, two or more of the server, the client device, and the third device may execute the computer program product to implement the method according to the embodiments of the disclosure in a distributed manner.

For example, the server (e.g., a cloud server, an AI server, etc.) may execute the computer program product stored in the server, and may control the client device communicating with the server to execute the method according to the embodiments of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a plurality of computing processors;
memory storing a plurality of recognition models and one or more instructions; and
a processor communicatively coupled to the plurality of computing processors and the memory,
wherein the one or more instructions, when executed by the processor, cause the electronic device to:
control at least one of the plurality of computing processors to obtain object information about one or more objects by recognizing the one or more objects existing in a space of a space map by using a first recognition model from among the plurality of recognition models, the space map corresponding to a space map of a structure,
based on the object information, divide the space of the space map into a plurality of subset spaces,
based on characteristic information of the plurality of subset spaces, determine at least one recognition model to be used in each of the plurality of subset spaces from among the plurality of recognition models, respectively,
assign the determined at least one recognition model to one of the plurality of computing processors based on an operation speed of each of the plurality of computing processors and at least one of a number of classes that are recognizable, an operation amount, or a runtime memory of the determined at least one recognition model, and
control the plurality of computing processors to perform object recognition by using the determined at least one recognition model and the one of the plurality of computing processors, to which the determined at least one recognition model is assigned, in response to the electronic device moving through each of the plurality of subset spaces, respectively.

2. The electronic device of claim 1, further comprising:
a sensor configured to obtain spatial structure information of the space by scanning the space,
wherein the one or more instructions, when executed by the processor, further cause the processor to:
generate the space map based on the spatial structure information, and
based on the space map and the object information, divide the space into the plurality of subset spaces.

3. The electronic device of claim 2, wherein the one or more instructions, when executed by the processor, further cause the processor to:
based on whether the structure of the space changes, determine whether to perform a scanning of the space, and
based on determining to perform the scanning of the space, control the sensor to scan the space while moving through the structure of the space.

4. The electronic device of claim 1, wherein classes recognizable by the first recognition model are higher classes than classes recognizable by the determined at least one recognition model with respect to each of the plurality of subset spaces.

5. The electronic device of claim 1, wherein types of objects that are recognizable by the determined at least one recognition model with respect to each of the plurality of subset spaces are less than types of objects that are recognizable by the first recognition model.

6. The electronic device of claim 1, wherein the one or more instructions, when executed by the processor, further cause the processor to:
in response to the operation amount of the determined at least one recognition model being equal to or greater than a first operation value, assign the determined at least one recognition model to a first determined computing processor, from among the plurality of computing processors, having the operation speed equal to or greater than a second operation value, and
in response to the operation amount of the determined at least one recognition model being less than the first operation value, assign the determined at least one recognition model to a second determined computing processor, from among the plurality of computing processors, having the operation speed less than the second operation value.

7. The electronic device of claim 1, wherein the one or more instructions, when executed by the processor, further cause the processor to:
divide the space into a first subset space classified as a first group and a second subset space classified as a second group, based on the object information,
based on characteristics of the first subset space, determine a second recognition model, from among recognition models corresponding to the first group, to be used in the first subset space, and based on characteristics of the second subset space, determine a third recognition model, from among recognition models corresponding to the second group, to be used in the second subset space.

8. The electronic device of claim 7, wherein the one or more instructions, when executed by the processor, further cause the processor to:
assign the second recognition model to a first computing processor from among the plurality of computing processors and assign the third recognition model to a second computing processor, based on characteristic information of the plurality of computing processors, characteristic information of the second recognition model, and characteristic information of the third recognition model,
control to perform object recognition in the first subset space by using the first computing processor and the second recognition model, and
control to perform object recognition in the second subset space by using the second computing processor and the third recognition model.

9. The electronic device of claim 7, further comprising:
a communicator,
wherein the one or more instructions, when executed by the processor, further cause the processor to:
control the communicator to transmit, to an external device, a request for recognition models corresponding to characteristic information of the plurality of computing processors, the first group, and the second group,
receive, from the external device, the recognition models corresponding to the first group and the second group, and
store the recognition models in the memory, and
wherein the recognition models corresponding to the first group and the second group received from the external device are determined based on the characteristic information of the plurality of computing processors.

10. An operating method performed by an electronic device, the operating method comprising:
obtaining, by the electronic device, object information about one or more objects by recognizing the one or more objects existing in a space of a space map by using a first recognition model from among a plurality of recognition models, the space map corresponding to a space map of a structure;
based on the object information, dividing, by the electronic device, the space of the space map into a plurality of subset spaces;
based on characteristic information of the plurality of subset spaces, determining, by the electronic device, at least one recognition model to be used in each of the plurality of subset spaces, from among the plurality of recognition models, respectively;
assigning, by the electronic device, the determined at least one recognition model to one of a plurality of computing processors, based on an operation speed of each of each of the plurality of computing processors and at least one of a number of classes that are recognizable, an operation amount, or a runtime memory of the determined at least one recognition model; and
performing, by the electronic device, object recognition by using the determined at least one recognition model and the one of the plurality of computing processors to which the determined at least one recognition model is assigned, in response to the electronic device moving through each of the plurality of subset spaces, respectively.

11. The operating method of claim 10, further comprising:
obtaining, by the electronic device, spatial structure information about the space by scanning the space; and
generating, by the electronic device, the space map based on the spatial structure information,
wherein the dividing of the space of the space map into the plurality of subset spaces comprises dividing the space into the plurality of subset spaces based on the space map and the object information.

12. The operating method of claim 11, further comprising:
based on whether the structure of the space changes, determining, by the electronic device, whether to perform a scanning of the space,
wherein the obtaining of the spatial structure information about the space comprises scanning the space in response to determining to perform the scanning of the space.

13. The operating method of claim 10, wherein classes recognizable by the first recognition model are higher classes than classes recognizable by the determined at least one recognition model with respect to each of the plurality of subset spaces.

14. A non-transitory computer-readable recording medium having stored thereon a program for performing the operating method of claim 10.

15. The electronic device of claim 1, wherein the one or more instructions, when executed by the processor, further cause the processor to:
based on characteristic information of the plurality of computing processors and characteristic information of the determined at least one recognition model, load at least one second recognition model among the plurality of recognition models onto a first computing processor among the plurality of computing processors while the electronic device moves through a first subset space among the plurality of subset spaces to perform object recognition, and
based on the characteristic information of the plurality of computing processors and the characteristic information of the determined at least one recognition model, load at least one third recognition model among the plurality of recognition models onto a second computing processor among the plurality of computing processors while the electronic device moves through a second subset space among the plurality of subset spaces to perform object recognition.

* * * * *